US008254264B1

(12) United States Patent
Banerjee et al.

(10) Patent No.: US 8,254,264 B1
(45) Date of Patent: Aug. 28, 2012

(54) NETWORK LATENCY ESTIMATION

(75) Inventors: Sujata Banerjee, Palo Alto, CA (US); Puneet Sharma, Palo Alto, CA (US); Sung-Ju Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1493 days.

(21) Appl. No.: 11/414,059

(22) Filed: Apr. 28, 2006

(51) Int. Cl.
*G01R 31/08* (2006.01)
*H04L 12/28* (2006.01)
(52) U.S. Cl. ........................ 370/238; 370/351
(58) Field of Classification Search .................. 370/238, 370/235
See application file for complete search history.

(56) References Cited

U.S. PATENT DOCUMENTS

| | | | |
|---|---|---|---|
| 6,937,569 B1 * | 8/2005 | Sarkar et al. | 370/238 |
| 7,111,061 B2 * | 9/2006 | Leighton et al. | 709/224 |
| 7,113,796 B2 * | 9/2006 | Zhang et al. | 455/456.2 |
| 7,123,589 B1 * | 10/2006 | Dawes et al. | 370/248 |
| 7,472,314 B2 * | 12/2008 | Bejerano et al. | 714/47 |
| 2004/0264407 A1 * | 12/2004 | Tang et al. | 370/328 |
| 2005/0135248 A1 * | 6/2005 | Ahuja et al. | 370/235 |

OTHER PUBLICATIONS

Chen et al., "On the stability of network distance estimation," ACM Performance Evaluation Review, vol. 30, No. 2, pp. 21-30, Sep. 2002.
Costa et al., "PIC: Practial internet coordinates for distance estimation," in Proceedings of the IEEE ICDCS 2004, Tokyo, Japan, Mar. 2004.
Fonseca et al., "Distributed querying of internet distance information," in Proceeding of the 8th IEEE Global Internet Symposium, Miami FL, Mar. 2005.
Francis et al., "IDMaps: A global internet host distance estimation service," IEEE/ACM Trans. Networking, vol. 9, No. 5, pp. 535-540, Oct. 2001.
Gummadi et al., "King: EStimating latency between arbitrary internet end hosts" in Proceeding of the ACM IMW, Marseille, France, Nov. 2002.
Ng et al., "Predicting Internet network distance with coordinate-based approaches," in Proceedings of the IEEE INFOCOM, New York, NY, Jun. 2002.
Ng et al., "A network positioning system for the internet," in Proceedings of the USENIX Annual Technical Conference, Boston, MA Jun. 2004.
Pias et al., "Lighthouses for scalable distributed location," in Proceedings of hte IPTPS, Berkeley, CA, Feb. 2003.
Ratnasamy et al., "Topolgoically aware overlay construction and server selection," in Proceedings of the IEEE INFOCOM, New York, NY, Jun. 2002.
Shavitt et al., "Computing the unmeasured: an algebraic approach to internet mapping," IEEE J. Select. Areas Commun., vol. 22. No. 1, pp. 67-78, Jan. 2004.
Tang et al., "Vitual landmarks for the Internet," in Proceedings of the ACM IMC, Miami Beach, FL, Oct. 2003.
Theilmann et al., "Dynamic distance maps of the Internet," in Proceedings of the IEEE INFOCOM, Tel Aviv, Israel, Mar. 2000, pp. 275-284.
Waldvogel et al., "Efficient topology-aware overlay network," in Proceedings of the ACM HotNets-I, Princeton, NJ, Oct. 2002.

* cited by examiner

*Primary Examiner* — Huy D Vu
*Assistant Examiner* — Angel Brockman

(57) ABSTRACT

A method includes sending signals from two nodes to a landmark, identifying common milestones along the routes, and determining distance information from the nodes to at least one of the common milestones. A system includes a program configured to send signals from two nodes to a landmark, identify common milestones along the routes, and provide distance information from each node to at least one of the common milestones, and a program configured to receive the distance information and provide a latency estimate based on the distance information.

16 Claims, 4 Drawing Sheets

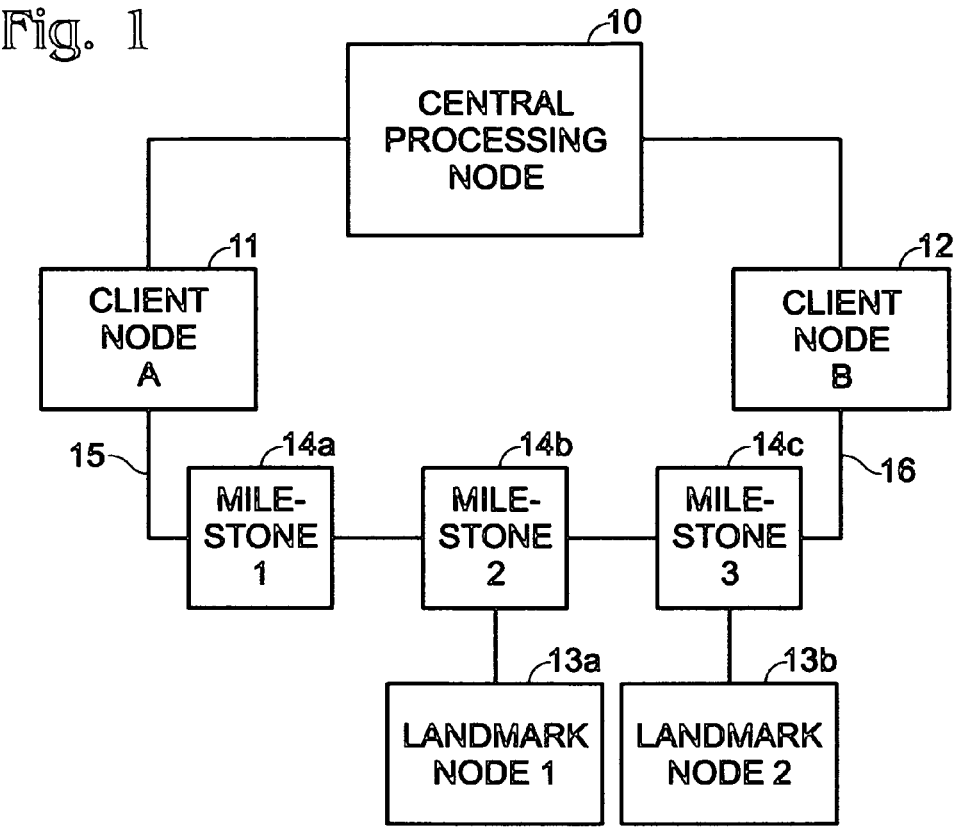
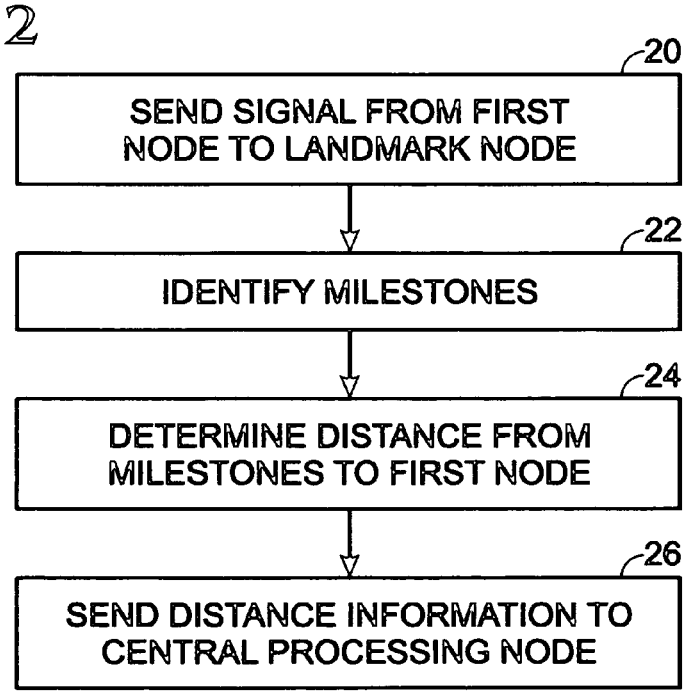

NETWORK LATENCY ESTIMATION

CROSS REFERENCE TO RELATED APPLICATION

This application is related to the subject matter disclosed in co-pending and commonly assigned U.S. patent application Ser. No. 10,767,075 filed Jan. 30, 2004.

BACKGROUND

It is often useful to measure the latency between two nodes in a network. However, as the size of a network grows, it is not always practical to perform point to point latency measurements between every given node in a network.

Several schemes have been proposed to estimate Internet distances (or latency). For example, Internet Distance Maps (IDMaps) and Dynamic Distance Maps (DDM) place tracers at key locations in the Internet. These tracers measure the latency between themselves and advertise the measured information to clients. The distance between two clients A and B is estimated as the sum of the distance between A and its closest tracer A', the distance between B and its closest tracer B', and the distance between tracers A' and B'.

M-Coop utilizes a network of nodes linked in a way that mimics the autonomous system (AS) graph extracted from BGP reports. Each node measures distances to a small set of peers. When an estimate between two IP addresses is required, several measurements are composed recursively to provide an estimate. King is similar in spirit to IDMaps and M-coop. It takes advantage of existing DNS architecture and uses the DNS servers as measurement nodes.

A number of schemes have proposed landmark techniques for network distance estimation. Landmark clustering techniques use a node's distance to a common set of landmark nodes to estimate the node's physical position. The intuition behind these techniques is that if two nodes have similar latencies to the land mark nodes, they are likely to be close to each other.

In landmark ordering, a node measures its round-trip time (RTT) to a set of landmarks and sorts the landmark nodes in the order of increasing round-trip time. Therefore, each node has an associated order of landmarks. Nodes with the same or similar landmark order(s) are considered to be close to each other. However, the technique cannot differentiate between nodes with the same landmark orders.

Despite numerous variations, previously described landmark techniques all share one major problem. They cause false clustering where nodes that have similar landmark vectors but are far away in network distance are clustered near each other.

While it can be seen that a number of latency estimation schemes have been proposed, alternative systems and methods for providing latency estimates are desirable.

BRIEF DESCRIPTION OF THE DRAWINGS

FIG. 1 is a block diagram of a system for providing latency estimates between two networked nodes according to an embodiment of the present disclosure.

FIG. 2 shows a method for identifying milestones along a pathway according to an embodiment of the present disclosure.

DETAILED DESCRIPTION

Figure 6:
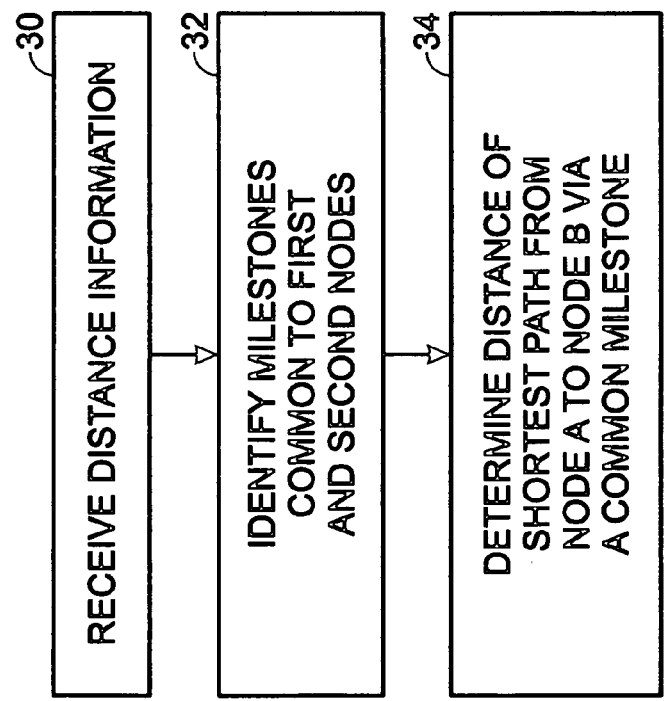
FIG. 6 shows an example of network paths taken by probes traveling from nodes A and B to a second landmark.

The present disclosure provides systems and method for providing an estimate of latency between two networked nodes. FIG. 1 is a block diagram of a system 10 suitable for use with the present invention. As shown in FIG. 1, client nodes 11 and 12 (also referred to as nodes A and B, respectively) are connected to a plurality of landmark nodes 13a, 13b (also referred to as landmark node 1 and landmark node 2, respectively) via a plurality of milestones 14a, 14b and 14c (also referred to as milestone 1, milestone 2 and milestone 3, respectively).

As shown, client nodes A and B are in communication with a central processing node 15. It will be understood that client nodes A and B may communicate with central processing node directly or indirectly.

According to the present disclosure, a node may be any device that can send and/or receive messages from another device via the network.

As used within the present disclosure, a landmark node may be any node for which location information is already known, or for which location information can be estimated or inferred within a suitable degree of accuracy. Those of skill in the art will appreciate that the suitable degree of accuracy will be entirely dependant upon the application. For example, according to some embodiments, a suitable degree of accuracy may be, for example, within a range of 1 ms to 20 ms. In another application, a suitable degree of accuracy may be a relative ranking of latency (e.g. from node X, node A has a higher latency than node B. It has been determined that a latency measurement error rates of 10% or even 20% provide useful results, and it should be understood that depending upon the particular application, even greater error rates may provide useful results. The location information for the landmark node may be obtained through some announcement and discovery mechanisms, or through other suitable techniques.

According to the present disclosure, a milestone may be any node through which a packet passes when traveling from a given client node to a given landmark node.

A physical location of a node, or the node's "location," as used herein, is the node's location in the network relative to other nodes in the network. For example, location information for the node may be determined by measuring distance to other nodes in the network. Distance to a node, for example, may be measured using a network metric such as round-trip-time (RTT) or network hops. It will be understood that distances between nodes and location information for nodes may not be the same as geographical distances between nodes and the actual geographical locations of the nodes. It should be further appreciated that while FIG. 1 is intended to show some, though not necessarily all, of the lines of communication between the various depicted nodes. FIG. 1 does not provide any location information about the nodes and location information should not be inferred from FIG. 1.

For ease of description, the system shown in FIG. 1 has been presented in a simplified manner. However, it will be understood that client nodes A and B may be part of a larger networked infrastructure and, as such, may be connected to a large number of landmark nodes, milestones, other client nodes, etc. which are not depicted. Moreover, none, some, or all of the not depicted nodes may be located between the depicted nodes.

According to one embodiment, the present disclosure provides a system and method for estimating latency between two client nodes, such as nodes A and B from FIG. 1. Initially, location information may be generated for all nodes in the system. The location information may be generated by sending probe packets from each client node (e.g. nodes A and B) to a given set of landmark nodes (e.g. landmark nodes 1 and 2). Along the way, the probe packets may encounter milestones (e.g. milestones 1, 2, and 3). A distance measurement may be generated between a client node and a milestone which has been discovered by a probe packet originating from the client node. For example, when a probe packet encounters a milestone, the milestone may send an acknowledgement packet back to the node that originated the probe packet. The acknowledgement packet may then be used to calculate RTT between the client node and the milestone.

After a node receives the distance measurements from the landmark nodes and encountered milestones (if any), the node may submit distance and or location information based on the distance measurements to a repository. The repository may be stored, for example, on a central processing node. The distance and/or location information may be the raw data containing the identities of (e.g. IP addresses) and distances (e.g. RTTs) to the encountered milestones. Alternatively or additionally, the client node may construct a landmark vector that includes the distances to all the landmarks as well as the identities of the milestones the probe packets have encountered. Once the landmark vector is constructed, the client node may submit the landmark vector to the repository. It should be noted that the locations and identities of the milestones need not have been known to the client node prior to sending out the probe packets. Rather, the milestones may be discovered and identified as milestones when a probe packet encounters them on the way to a landmark node. Accordingly, according to one embodiment, there is no need to initially create or even select nodes that will act as milestones.

Accordingly, a method for obtaining location information for a single client-landmark node pair is shown in FIG. 2. As shown, at 20, a signal (e.g. probe packet) is sent from a first (client) node to a landmark node. At 22, milestones along the path from the client to the landmark are identified. At 24, the distance from each milestone to the first node is calculated. At 26, the distance information is sent to a central processing node.

Once the distance information is received by the central processing node, the central processing node (by way of a program operating thereon) may use this information to provide latency estimates for client nodes in the network.

Figure 3:
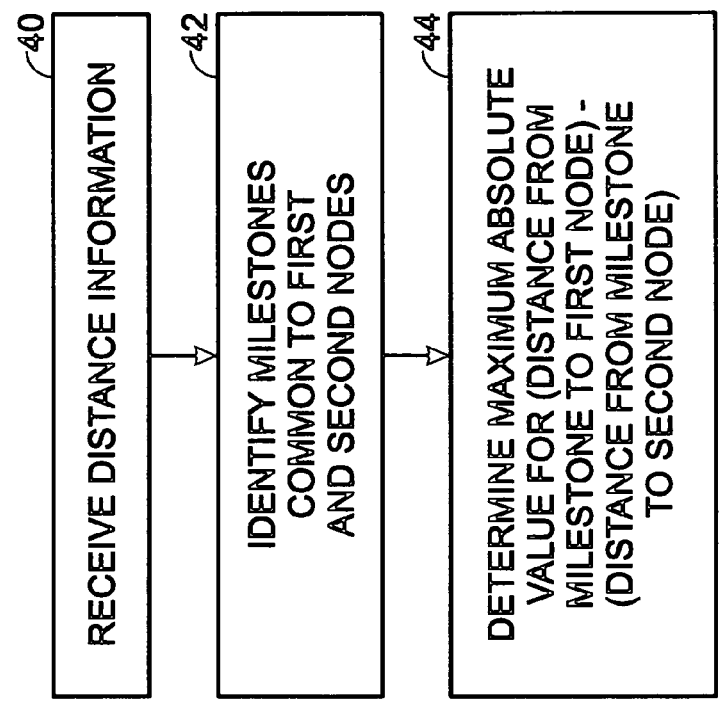
FIG. 3 shows a method for providing latency estimates between two networked nodes according to an embodiment of the present disclosure.

A first method of using the distance information to provide a latency estimate for client nodes in the network is shown in FIG. 3. This method relies on the theory that if there are a sufficient number of milestones that two nodes A and B measure against, it is very likely that one of the milestones (the "intermediate common milestone") is located on the shortest path between the two nodes. The distance from node A to the intermediate common milestone plus the distance from the intermediate common milestone to node B will therefore provide an estimate of the upper bound of latency between nodes A and B.

According to the method depicted in FIG. 3, at 30, distance information is received. At 32 milestones that are common to the paths taken from each client node to the same landmark node are identified. For example, returning to FIG. 1, a probe packet traveling from client node A to landmark node 1 would encounter milestone 1 and milestone 2. A probe packet traveling from client node B to landmark node 1 would encounter milestone 3 and milestone 2. Accordingly, milestone 2 is a common milestone for client nodes A and B. Similarly, a probe packet traveling from client node A to landmark node 2 would encounter milestone 1, milestone 2, and milestone 3. A probe packet traveling from client node B to landmark node 2 would encounter milestone 3. Accordingly, milestone 3 is also a common milestone for client nodes A and B.

Returning to FIG. 3, at 34, the shortest path from node A to node B via a common milestone is identified. This may be accomplished, for example, by identifying the common milestone for which the sum of the distance from A to the common milestone plus the distance from B to the common milestone is the smallest. This "minimum sum" (or min_sum) value is the shortest distance among all overlay paths between nodes A and B constructed using each milestone common to nodes A and B. Thus, the min_sum value provides an upper bound on latency between nodes A and B and can be used as an estimate of the latency between nodes A and B.

Figure 4:
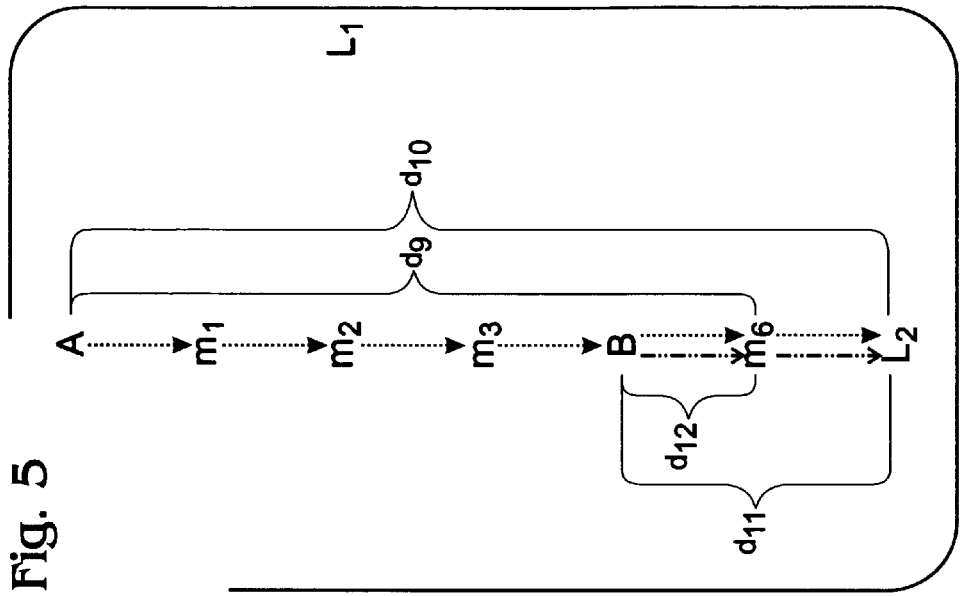
FIG. 4 shows another method for providing latency estimates between two networked nodes according to another embodiment of the present disclosure.
Figure 5:
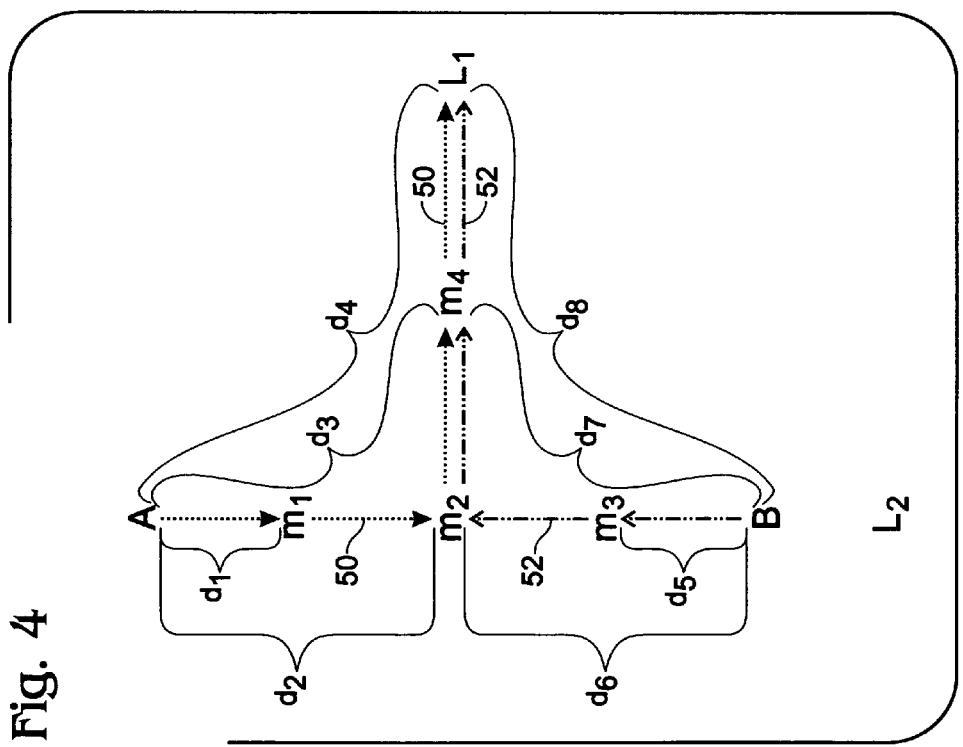
FIG. 5 shows an example of network paths taken by probes traveling from nodes A and B to a first landmark.

FIGS. 4 and 5 provide a schematic illustration of networks paths taken by probes traveling from probes A and B to Landmark 1 ($L_1$) and Landmark 2 ($L_2$), respectively. For simplicity, only two landmark nodes are shown, however, it will be understood that the method could incorporate distance information derived from probe packets sent to any number of landmarks in the network.

In FIG. 4, node A sends a probe packet to Landmark 1 ($L_1$). The probe packet travels along path 50 (shown by the dotted line), encountering several milestones, $m_1$, $m_2$, $m_4$, and $L_1$ along the way. At each milestone, an acknowledgement packet is sent back to node A, from which node A is able to calculate RTT from itself to the milestone. It should be noted that, like the milestones, each landmark returns an acknowledgement packet to the client node so that each client node can calculate RTT from the landmark to itself. Accordingly, for the purposes of latency estimation, each landmark could be considered a milestone and, therefore, included in the corresponding set of common milestones for client nodes sending probe packets to that landmark. Upon receiving the acknowledgment packets, node A is able to calculate: $d_1$, the RTT between node A and $m_1$; $d_2$, the RTT between node A and $m_2$; $d_3$, the RTT between node A and $m_4$; and $d_4$, the RTT between node A and $L_1$.

Similarly, node B also sends a probe packet to $L_1$. Node B's probe packet travels along path 52 (shown by the dot-dashed line) and encounters milestones $m_3$, $m_2$, $m_4$, and $L_1$ along the way. At each milestone, an acknowledgement packet is sent back to node B, from which node B is able to calculate RTT from itself to the milestone. Thus, node B calculates: $d_5$, the RTT between node B and $m_3$; $d_6$, the RTT between node B and $m_2$; $d_7$, the RTT between node B and $m_4$; and d8, the RTT between node B and $L_1$.

As stated above, before sending the porbe packets, nodes A and B have prior knowledge of landmarks 1 and 2. However, they may have no information related to any milestones that may exist between them and each landmark, since the milestones are pre-existing nodes that are "discovered" as the probe packets travel to the milestones. Thus, in FIG. 4, $L_2$ is depicted, but no milestones outside of those that the probe packets travel through to reach $L_1$ are shown connecting nodes A or B to $L_2$. Similarly, in FIG. 5, $L_1$ is shown, but no milestones outside of those that the probe packets travel through to reach $L_2$ are shown connecting nodes A or B to $L_1$.

In FIG. 5, node A sends a probe packet to Landmark 2 ($L_2$). Node A's probe packet travels along path $m_1$, $m_2$, $m_3$, B (which node A sees as another milestone) $m_6$ and $L_2$. Again, each milestone sends an acknowledgement packet back to node A from which A is able to calculate the various RTTs between itself and each milestone. For ease of illustration, the only distance measurements corresponding to node A that are shown in FIG. 5 are $d_9$, the RTT between node A and $m_6$ and $d_{10}$, the RTT between node A and $L_2$. As before, node B also sends a probe packet to $L_2$. Along the path node B encounters $m_6$ and $L_2$. Node B receives the acknowledgement packets from these milestones and calculates $d_{11}$, the RTT from B to $L_2$ and $d_{12}$, the RTT from B to $m_6$.

As stated above, once the client nodes A and B have received the distance and identification information for each milestone, this information is forwarded to the central processing node. A program residing on the central processing node then identifies the milestones common to nodes A and B. In this case, for $L_1$ the common milestones are $m_2$, $m_4$ and $L_1$. For $L_2$, the common milestones are $m_6$ and $L_2$. Once the common milestones are identified, the shortest total distance from Node A to a given milestone plus Node B to the same milestone is identified. Accordingly, for $L_1$, the distances $d_2+d_6$ (corresponding to $m_2$), $d_3+d_7$ (corresponding to $m_4$) and $d_4+d_8$ (corresponding to $L_1$) are calculated. For $L_2$, the distances $d_9+d_{12}$ (corresponding to $m_6$) and $d_{10}+d_{12}$ (corresponding to $L_2$) are calculated. According to the min_sum method, these calculations are compared and the smallest value will be identified as the best estimate of latency between nodes A and B. It will be understood that as additional information from other landmarks is included in the calculation, the likelihood of encountering a milestone located on the shortest path between the two nodes increases and the accuracy of the latency estimate increases. It will be further understood that the shortest distance found may not and need not be an exact measurement of the latency between nodes A and B in order to provide a relatively accurate estimate of the latency between nodes A and B.

It should be noted that while the set of common milestones are identified, in order to provide a latency estimate is not necessary to specifically call out or identify to a user which milestone is the intermediate common milestone, it is sufficient simply to calculate the distances between nodes A and B and the various common milestones and determine which of those distances has the smallest value, and provide that value to the user as a latency estimate.

A second method for deriving a latency estimate from milestone information is shown in FIG. 6. The method depicted in FIG. 6 relies on the supposition that if there are a sufficient number of milestones that both client nodes A and B measure against, then there is a high likelihood that there exists a "linear milestone" such that node A is on the shortest path from node B to the linear milestone or that node B is on the shortest path from node A to the linear milestone. In this case, the absolute value of the distance from A to the linear milestone minus the distance from B to the milestone will be the maximum value when the latency between A and B is most closely estimated.

According to the depicted method, at 40, distance information is received from nodes A and B. At 42, the milestones common to both nodes A and B are identified. At 44, the maximum absolute value for the difference of node A to the linear milestone minus the distance from node B to the linear milestone is determined.

Returning to FIGS. 4 and 5 probe packets are sent from node A to L1 and L2 and from node B to L1 and L2 and the RTTs are calculated by the respective nodes as described above with respect to the min_sum method.

As stated above, once the client nodes A and B have received the distance and milestone information, this information may be forwarded to, a latency estimation program, which may be hosted, for example, by a central processing node. The latency estimation program may then identify milestones that are common to nodes A and B in the manner described with respect to the min_sum method. Once the common milestones are identified, the absolute value of the distance from node A to a given common milestone minus the distance from node B to the same milestone is identified. For instance, in the FIG. 6 example, the latency estimation program would calculate $|d_2-d_6|$, $|d_3-d_7|$, $|d_4-d_8|$, $|d_9-d_{12}|$ and $|d_{10}-d_{11}|$. The largest value identified during these calculations provides an estimate of the latency between nodes A and B.

Again, it should be noted that while the set of common milestones are identified, in order to provide a latency estimate is not necessary to specifically call out or identify to a user which milestone is the linear common milestone, it is sufficient simply to calculate the distances between nodes A and B and the various common milestones, take the absolute value of the difference of those distances, and determine which of those distances has the largest value, and provide that value to the user as a latency estimate.

It will be well understood that network latency estimates can be used for a wide variety of applications. Several examples are described below. The described applications should be viewed as non-limiting examples only, and not considered as limiting the scope of any presently described invention or any embodiment(s) thereof.

Latency estimates may be used as part of an infrastructure management technique. For example, as explained above, the latency estimates from the technique shown and described with respect to FIGS. 3-6 may be used to provide an upper bound on the latency between two nodes. This upper bound could be used as a threshold measurement. If the actual latency between the nodes is substantially higher than the threshold measurement, this could be interpreted as a signal that something about the network has changed and the system could be investigated to determine if there is a problem, e.g. a particular router may be damaged or otherwise unavailable.

Accordingly, the present disclosure provides a method for identifying network latency problems. The method may include, for example, estimating an expected latency between a first node and a second node by identifying milestones that are common to both the first node and the second node and determining an expected latency between the two nodes based on the distance from the first node to the common milestone and the distance from the second node to the common milestone. The method may further include measuring the actual latency between the first node and the second node. The method may still further include determining whether the actual latency is greater than the expected latency and, if the actual latency is greater than the expected latency, identifying if a network problem exists.

Alternatively, or additionally, if the latency estimate for two given nodes changes over time, this may be viewed as an indication that the routing between the two nodes has changed. If such a change was undesirable or unforeseen, for example, the network could be investigated.

Accordingly, the present disclosure provides a method for identifying network routing changes. The method may include, for example, determining a first latency estimate between a first node and a second node by identifying milestones that are common to both the first node and the second node and determining a latency estimate between the two nodes based on the distance from the first node to the common milestone and the distance form the second node to the common milestone. The method may further include determining a second latency estimate between a first node and a second node by identifying milestones that are common to both the first node and the second node and determining a latency estimate between the two nodes based on the distance from the first node to the common milestone and the distance form the second node to the common milestone. The method may still further include comparing the first latency estimate and the second latency estimate and determining if a difference exists. If a difference exists, the method may further include determining whether there has been a network routing change.

Alternatively or additionally, latency estimates can be used as part of an application management technique. For example, many real time applications may require that latency be maintained below a certain value. By periodically obtaining a latency estimate, a system manager could identify whether or not latency is being maintained as desired. Accordingly, methods such as those described above could be used to determine whether or not the desired latency values are being maintained.

Furthermore, certain service level agreements may require a network provider to maintain latency below a certain level. Again, methods such as those described above could be used to determine whether or not the agreed upon latency values are being maintained and further, as substantial proof that the agreed upon latency values are being maintained.

Figure 7:
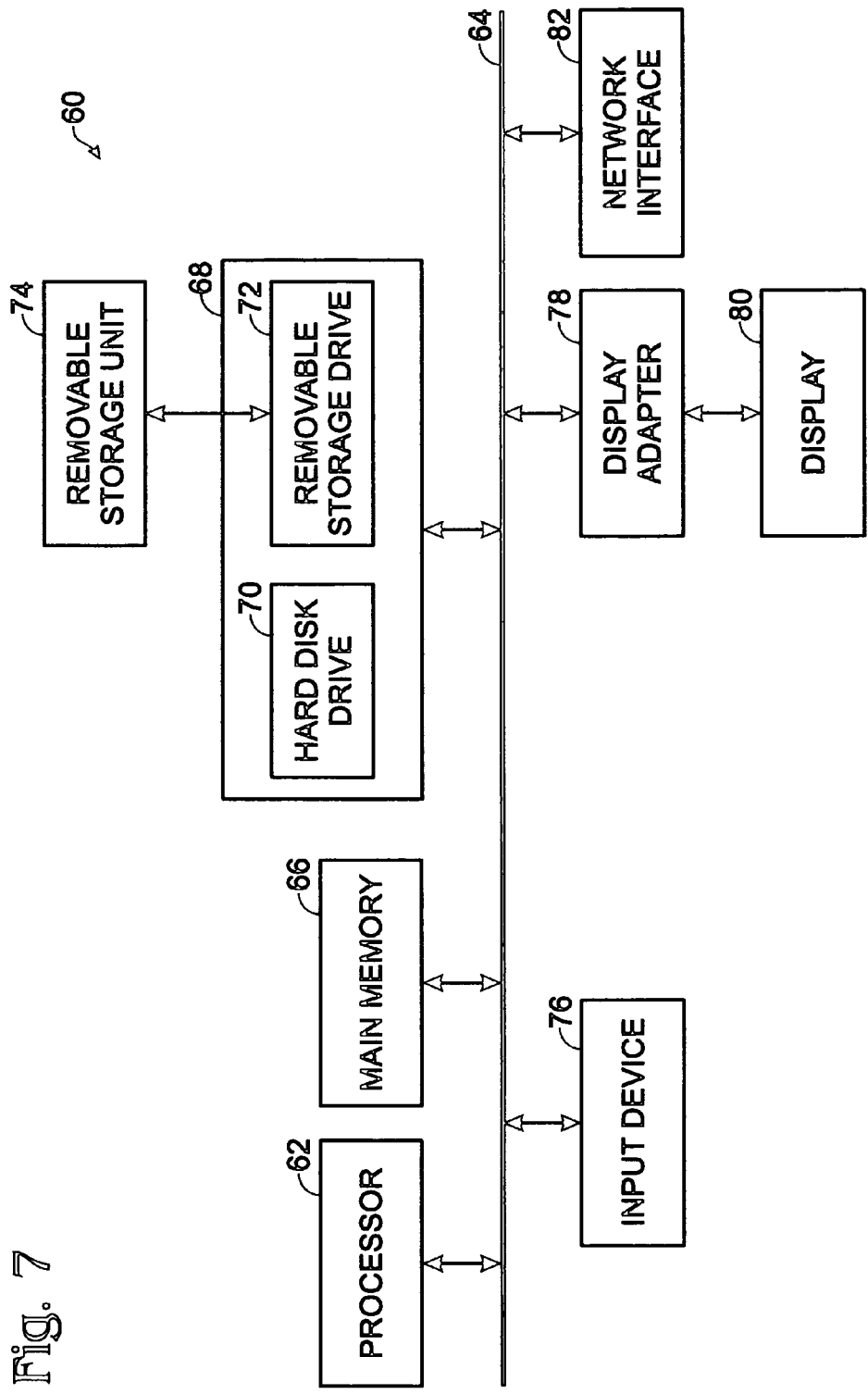
FIG. 7 is a block diagram of an exemplary computer system suitable for use with the systems and methods of the present disclosure.

It will be appreciated that one or more of the nodes (e.g. a client, milestone, landmark, or central processing node) may take the form of a computer system. FIG. 7 provides a block diagram of a computer system 60 suitable for use with the networks, systems, and methods described above. The computer system 60 may include one or more processors 62, which may provide a platform for executing a software program.

Commands and data from the processor 62 may be communicated over a communication bus 64. The computer system 60 may also include a main memory 66, such as a Random Access Memory (RAM), where software may be executed during runtime, and a secondary memory 68. The secondary memory 68 may include, for example, a hard disk drive 70 and/or a removable storage drive 72. The removable storage drive may take the form of a floppy diskette drive, a magnetic tape drive, a compact disk drive, a nonvolatile memory, or the like. A copy of a software program being executed by main memory 66 may or may not be stored on hard disk drive 70 and/or removable storage drive 72. The secondary memory 68 may include Read Only Memory (ROM), Erasable, Programmable ROM (EPROM), Electrically, Erasable, Programmable ROM (EEPROM), or the like. In addition to software, routing tables, measured network metrics, and other data may be stored in main memory 66 and/or secondary memory 68. Removable storage drive 72 may read from and/or write to a removable storage unit 74 in a known manner.

Computer system 60 may include a user input device 76 such as a keyboard, mouse, stylus, or the like. A display adaptor 78 may interface with the communication bus 64. A display 80 may receive display data from processor 62 and convert the display data into display commands. A network interface 82 may be provided for communicating with other nodes via a network.

One or more of the steps of the above-described methods may be implemented as a software program embedded on a computer readable medium, such as memory 66 and/or 68. The steps may be embodied by a computer program that may exist in a variety of forms, both active and inactive. For example, the steps may exist as one or more software programs including program instructions in source code, object code, executable code, or other formats for performing some of the steps. Any of the above may be embodied on a computer readable medium, which may include storage devices and signals, in compressed or uncompressed form.

Without wishing to be limited, examples of suitable computer readable storage devices include conventional system Random Access Memory (RAM), ROM, EPROM, EEPROM, and magnetic or optical disks or tapes. Non-limiting examples of computer readable signals, whether modulated using a carrier or not, are signals that a computer system hosting or running the computer program may be configured to access, including signals downloaded through the Internet or other networks. Concrete examples of the foregoing include distribution of the programs on a Disk, CD ROM, DVD, or via Internet download. The Internet itself, as well as other computer networks, may be considered a computer readable medium.

Accordingly, it will be understood that software running on a computer such as that shown and described with respect to FIG. 7, may be configured to perform any of the methods and/or method steps described above. Moreover, it will be understood that the various method steps described above should not be considered as limited to the specific embodiments as described, but rather may be altered, combined, or separated, and performed in any order or simultaneously, as desired, for a given application. It will be further understood that even in a particular embodiment, the various method steps may not all be performed by the same program and/or even by the same computer or computing system.

While the invention has been described with reference to the exemplary embodiments thereof, those skilled in the art will be able to make various modifications to the described embodiments without departing form the true spirit and scope of the disclosure. Accordingly, the terms and descriptions used herein are set forth by way of illustration only and are not meant as limitations.

What is claimed is:

1. A method for estimating latency between a first node and a second node comprising:
   sending a first signal from the first node to a landmark node along a first path; sending a second signal from the second node to the landmark node along a second path; wherein the second node is on the path between the first node and the landmark node; identifying a common milestone on the first and second paths, wherein the common milestone is a node on the first path between the first node and the landmark node, and on the second path between the second node and the landmark node; determining a first distance from the first node to the common milestone; determining a second distance from the second node to the common milestone; and estimating the latency based on the first and second distances by: determining a common milestone that is positioned such that the second node is on a shortest path between the first node and the common milestone by subtracting the first distance from the second distance.

2. The method of claim 1 wherein identifying one or more common milestones on the first and second paths comprises:
   identifying one or more milestones on the first path;
   identifying one or more milestones on the second path; and identifying common milestones by determining which milestones are on both the first path and the second path.

3. The method of claim 1 wherein estimating latency based on the first and second distances by determining the sum of the first distance and the second distance further comprises identifying an intermediate common milestone by determining the common milestone for which the sum of the first distance and the second distance is the smallest value.

4. The method of claim 1 further comprising providing the first distance and the second distance to a central processing node.

5. The method of claim 4 where the central processing node performs the steps of identifying a common milestone on the first and second path and estimating latency based on the distances from the first and second nodes to the common milestone.

6. The method of claim 1 wherein sending a signal from the first node to a landmark node along a first path comprises transmitting a first probe packet from the first node to the landmark node; and wherein
sending a signal from the second node to the landmark node along a second path comprises transmitting a second probe packet from the second node to the landmark node.

7. The method of claim 6 wherein determining a distance from the first node to the common milestone comprises receiving an acknowledge message from the common milestone receiving the first probe packet; and wherein
determining a distance from the second node to the common milestone comprises receiving an acknowledge message from the common milestone receiving the second probe packet.

8. The method of claim 1 wherein estimating latency based on the first and second distances by determining the sum of the first distance and the second distance further comprises identifying an intermediate common milestone from a plurality of common milestones by determining the common milestone for which the sum of the first distance and the second distance is a smallest value.

9. Computer software embedded on a non-transitory tangible computer readable storage medium, the computer software comprising instructions that when executed by a computer perform a method comprising: identifying a milestone along a first path from a first node to a landmark node, wherein the milestone is a node on the first path between the first node and the landmark node; determining a first distance from the milestone to the first node;
identifying the milestone along a second path from a second node to the landmark node,
wherein the milestone is on the second path between the second node and the landmark node;
determining a second distance from the milestone to the second node; and
determining an estimated latency between the first and second nodes based on the first and second distances by determining a common milestone that is positioned such that the second node is on a shortest path between the first node and the common milestone by subtracting the first distance from the second distance.

10. The computer software of claim 9 wherein instructions performing determining an estimated latency by determining the sum of the first distance and the second distance comprise identifying the milestone for which the sum of the first and second distances is the smallest value.

11. The computer software of claim 9 wherein:
identifying a milestone along a first path from a first node to a landmark node comprises identifying a plurality of milestones along a plurality of first paths from a first node to a plurality of landmark nodes;
determining a first distance from the milestone to the first node comprises determining a plurality of first distances from the plurality of milestones on the first paths to the first node;
identifying the milestone along a second path from a second node to the landmark node comprises identifying a plurality of milestones along a plurality of second paths from a second node to the plurality of land mark nodes;
determining a second distance from the milestone to the second node comprises determining a plurality of second distances from the plurality of milestones on the second paths to the second node; and
determining an estimated latency based on the first and second distances comprises:
identifying, for each landmark, a set of common milestones that are on a first path to a landmark and a second path to the landmark;
determining the distance from the first and second nodes to each milestone in the set of common milestones; and
determining the estimated latency between the first and second node by finding a smallest value for the sum of the distance from the first and second nodes to the same common milestone.

12. The computer software of claim 9 wherein instructions performing determining an estimated latency by determining a sum of the first distance and the second distance comprise identifying a milestone from a plurality of milestones for which the sum of the first and second distances is a smallest value.

13. The computer software of claim 9 wherein instructions performing determining an estimated latency by subtracting the first distance from the second distance comprise identifying the milestone from a plurality of milestones for which the first distance subtracted from the second distance has a largest absolute value.

14. A system for estimating latency between a first client node and second client node in a network, the system comprising:
a plurality of client nodes; including a first and second client node, wherein the second client node is on the path between the first node and at least one landmark node, wherein the landmark node has an identified location;
a traceroute program configured to: send a signal on a pathway from the first client node to the landmark node; identify a milestone discovered on the pathway; and determine the a distance between the first client node and the identified milestone on the pathway; and a central processing program configured to receive the distance information generated by the traceroute program and perform latency calculations based on the received distance information by determining an identified milestone that is positioned such that the second client node is on a shortest path between the first client node and the identified milestone by subtracting a first distance for the first client node from a second distance for the second client node.

15. The system of claim 14 wherein the central processing program is further configured to identify a common milestone that is located on both a first path between the first client node and the landmark and a second path between the second client node and the landmark.

16. The system of claim 15 wherein the central processing program is further configured to identify a common intermediate milestone on the first and second paths.

* * * * *

UNITED STATES PATENT AND TRADEMARK OFFICE
CERTIFICATE OF CORRECTION

| | | |
|---|---|---|
| PATENT NO. | : 8,254,264 B1 | Page 1 of 1 |
| APPLICATION NO. | : 11/414059 | |
| DATED | : August 28, 2012 | |
| INVENTOR(S) | : Sujata Banerjee et al. | |

It is certified that error appears in the above-identified patent and that said Letters Patent is hereby corrected as shown below:

In the Claims:

In column 10, line 9, in Claim 11, delete "land mark" and insert -- landmark --, therefor.

In column 10, line 46, in Claim 14, delete "the a" and insert -- a --, therefor.

Signed and Sealed this
Twenty-eighth Day of May, 2013

Teresa Stanek Rea
*Acting Director of the United States Patent and Trademark Office*